US010627963B2

(12) United States Patent
Lee et al.

(10) Patent No.: US 10,627,963 B2
(45) Date of Patent: Apr. 21, 2020

(54) DISPLAY DEVICE INCLUDING TOUCH SENSOR ELECTRODES HAVING A PARTICULAR PITCH

(71) Applicant: Samsung Display Co., Ltd., Yongin, Gyeonggi-Do (KR)

(72) Inventors: Duk Jin Lee, Suwon-si (KR); In Young Han, Cheonan-si (KR); Hye Jung Park, Cheonan-si (KR); Jung Hee Son, Asan-si (KR); Woo Suk Jung, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 65 days.

(21) Appl. No.: 14/805,216

(22) Filed: Jul. 21, 2015

(65) Prior Publication Data

US 2016/0202814 A1 Jul. 14, 2016

(30) Foreign Application Priority Data

Jan. 12, 2015 (KR) .................. 10-2015-0004341

(51) Int. Cl.
*G06F 3/047* (2006.01)
*G06F 3/044* (2006.01)
(Continued)

(52) U.S. Cl.
CPC ............ *G06F 3/044* (2013.01); *G06F 3/0412* (2013.01); *G09G 3/3233* (2013.01);
(Continued)

(58) Field of Classification Search
CPC ........... G09G 5/003; G09G 2300/0452; G09G 3/2003; G09G 3/3225; G09G 2300/0426; G09G 3/3233; G09G 2300/0842; G06F 3/047; G06F 3/044; G06F 3/0412; G06F 2203/04103
See application file for complete search history.

(56) References Cited

U.S. PATENT DOCUMENTS

2007/0097278 A1\* 5/2007 Rho .................... G02F 1/13338
349/12
2009/0242890 A1\* 10/2009 Miyasaka ............. H01L 27/124
257/66

(Continued)

FOREIGN PATENT DOCUMENTS

KR 10-2010-0097018 A 9/2010
KR 10-2012-0108927 A 10/2012
(Continued)

*Primary Examiner* — Yaron Cohen
(74) *Attorney, Agent, or Firm* — Innovation Counsel LLP

(57) ABSTRACT

A display device according to an exemplary embodiment of the present system and method includes a substrate; a display active layer disposed on the substrate, the display active layer including a plurality of pixels that are configured to display a first color, a second color, and a third color, respectively, and a touch sensing layer disposed on the display active layer. The touch sensing layer includes first touch electrodes and second touch electrodes, which are separated from each other, and gaps between the first touch electrodes and the second touch electrodes. The gaps are formed to expose first color pixels configured to display the first color and non-pixel areas.

16 Claims, 13 Drawing Sheets

(51) Int. Cl.
*G09G 5/00* (2006.01)
*G06F 3/041* (2006.01)
*G09G 3/3233* (2016.01)
*G09G 3/20* (2006.01)

(52) U.S. Cl.
CPC . *G06F 2203/04103* (2013.01); *G09G 3/2003* (2013.01); *G09G 2300/0426* (2013.01); *G09G 2300/0452* (2013.01); *G09G 2300/0842* (2013.01)

(56) References Cited

U.S. PATENT DOCUMENTS

| | | | | |
|---|---|---|---|---|
| 2010/0079381 | A1* | 4/2010 | Hayashi | G06F 3/044 345/172 |
| 2011/0049486 | A1* | 3/2011 | Kwak | C07D 209/58 257/40 |
| 2012/0313881 | A1* | 12/2012 | Ge | G02F 1/13338 345/174 |
| 2013/0342770 | A1 | 12/2013 | Kim et al. | |
| 2014/0226089 | A1* | 8/2014 | Guard | G06F 3/0412 349/12 |
| 2014/0347315 | A1* | 11/2014 | Mo | G06F 3/044 345/174 |
| 2015/0077350 | A1* | 3/2015 | Hinson | G06F 3/044 345/173 |
| 2016/0299627 | A1* | 10/2016 | Yang | G06F 3/044 |

FOREIGN PATENT DOCUMENTS

| | | |
|---|---|---|
| KR | 10-2013-0015582 A | 2/2013 |
| KR | 10-2014-0042318 A | 4/2014 |

\* cited by examiner

DISPLAY DEVICE INCLUDING TOUCH SENSOR ELECTRODES HAVING A PARTICULAR PITCH

CROSS-REFERENCE TO RELATED APPLICATION

This application claims priority to and the benefit of Korean Patent Application No. 10-2015-0004341 filed in the Korean Intellectual Property Office on Jan. 12, 2015, the entire contents of which are incorporated herein by reference.

BACKGROUND (a) Technical Field

The present disclosure relates to a display device including a touch sensor.

(b) Description of the Related Art

A flat panel display (FPD), such as an organic light emitting diode display (OLED), a liquid crystal display (LCD), and an electrophoretic display (EPD), includes a display panel having an electric field generating electrode and an electro-optical active layer formed therein. Panels of an organic light emitting diode display (OLED), a liquid crystal display (LCD), and an electrophoretic display (EPD) include an organic emission layer, a liquid crystal layer, and electrically charged particles, respectively, as an electro-optical active layer. The electric field generating electrode may be connected to a switching element, such as a thin film transistor, and configured to receive a data signal. The electro-optical active layer displays an image by converting the data signal into an optical signal.

Such a display device may include a touch sensing function for detecting user input, in addition to an image display function using a display panel. For example, when a user touches the screen with one or more fingers or a touch pen, the touch sensing function of the display device may sense a change in pressure applied to the screen, amount of electric charge stored in underlying capacitors, and/or light to detect touch information, such as whether an object has touched the screen, and if so, the position where the screen was touch. A display device may receive an image signal based on such touch information.

The touch sensing function may be implemented using a capacitance-type touch sensor including touch electrodes. The touch electrodes in the capacitance-type touch sensor form a capacitor. The capacitance-type touch sensor senses a change in the capacitance of the capacitor when a touch is applied. The touch information may be generated based on the sensed change in the capacitance.

A space is formed between adjacent touch electrodes. To prevent a moiré or touch electrode pattern from being perceived due to the space, a dummy electrode may be formed in the space between the touch electrodes using the same material as the touch electrodes.

The above information disclosed in this Background section is only for enhancement of understanding of the background of the present disclosure and, therefore, may contain information that does not form the prior art that is already known in this country to a person of ordinary skill in the art.

SUMMARY

The present system and method provide a display device including a touch sensor in which the reflectance of a touch sensing layer and the power consumption of the display device are advantageously reduced.

An exemplary embodiment of the present system and method provides a display device including a first substrate; a display active layer disposed on the first substrate, the display active layer including a plurality of pixels that are configured to display a first color, a second color, and a third color, respectively, and a touch sensing layer disposed on the display active layer. The touch sensing layer includes first touch electrodes and second touch electrodes, which are separated from each other, and gaps between the first touch electrodes and the second touch electrodes. The gaps are formed to expose first color pixels configured to display the first color and non-pixel areas.

The touch sensing layer may be free from dummy electrodes in the gaps.

An edge of each of the first and second touch electrodes may be formed in a stair shape.

The first color pixels may be green pixels.

The gaps may be formed to further expose second color pixels adjacent to the first color pixels.

The second color pixels may be blue pixels.

The gaps may be formed to further expose third color pixels adjacent to the first color pixels.

The third color pixels may be red pixels.

The first color pixel, the second color pixel, and the third color pixel may constitute a unit pixel, and a pitch of each of the first and second touch electrodes may be a multiple of a pitch of the unit pixel.

The first and second touch electrodes may be formed of a transparent conductive oxide.

The transparent conductive oxide may be an indium tin oxide.

The display device may further include first connectors for connecting the first touch electrodes that are adjacent to each other and second connectors for connecting the second touch electrodes that are adjacent to each other. At least one of the first connector and the second connector may be formed of a transparent conductive oxide.

One of the first connector and the second connector may include a part formed of a transparent conductive oxide and a part formed of a metal material.

The display device may further include a second substrate disposed on the display active layer and the touch sensing layer may be formed on the second substrate.

The pixel may include a light-emitting device.

According to an embodiment of the present system and method, it is possible to reduce reflection by the touch sensing layer and to improve power consumption of the display device.

DETAILED DESCRIPTION OF THE EMBODIMENTS

Figure 1:
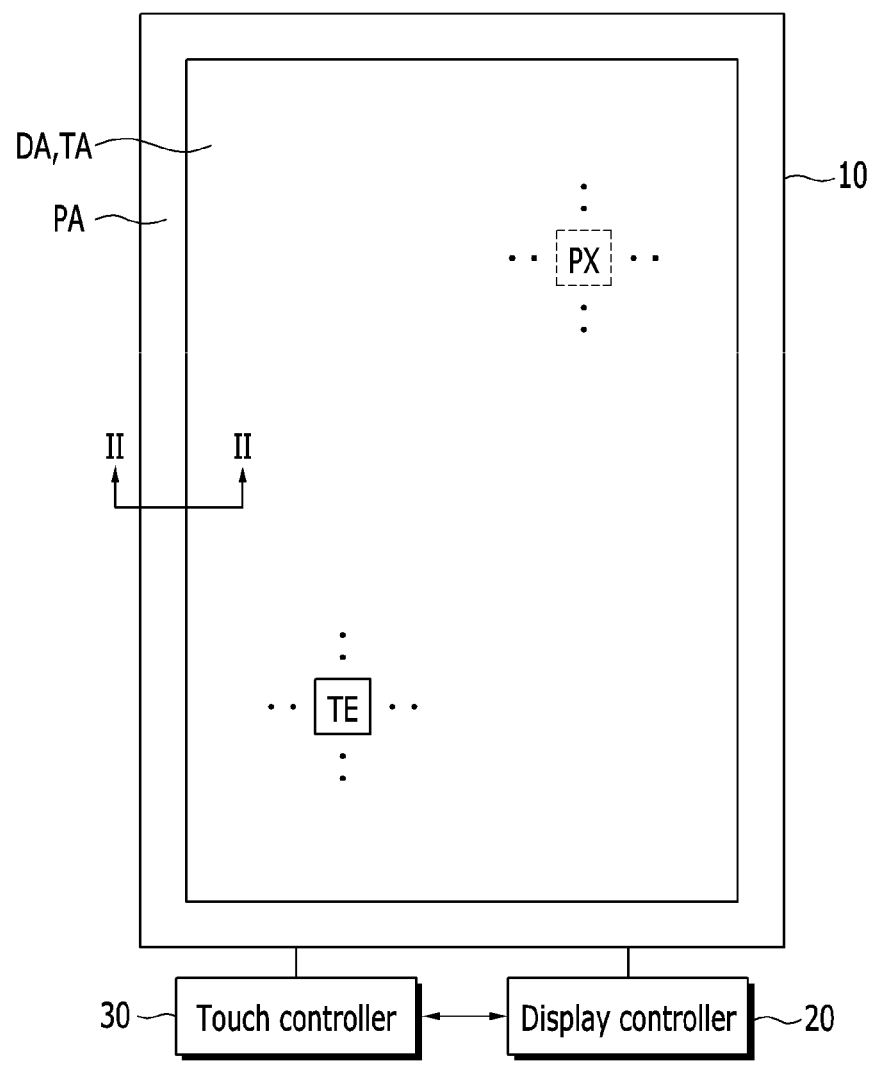
FIG. 1 is a schematic view showing a display device according to an exemplary embodiment of the present system and method.

Hereinafter, embodiments of the present system and method are described in detail with reference to the accompanying drawings in such a manner that the technical idea of the present system and method may easily be carried out by a person with ordinary skill in the art to which the system and method pertain. As those skilled in the art would realize, the described embodiments may be modified in various different ways, all without departing from the spirit or scope of the present system and method.

In the drawings, the thickness of layers, films, panels, regions, etc., are exaggerated for clarity. In addition, the spacing between adjacent constituent elements, the width of each constituent element, etc., may be exaggeratedly shown. Like reference numerals designate like elements throughout the specification. When an element such as a layer, film, region, or substrate is referred to as being "on" another element, it may be directly on the other element, or intervening elements may also be present. In contrast, when an element is referred to as being "directly on" another element, there are no intervening elements present. Unless stated otherwise in the specification, the term "overlap" used herein means overlapping from a plan view.

A display device according to an exemplary embodiment of the present system and method is described in detail with reference to the accompanying drawings. Although an organic light emitting diode display is mainly described, the present system and method may be applied to other display devices such as a liquid crystal display, an electrophoretic display, and a plasma display device.

First, the display device according to an exemplary embodiment of the present system and method is described with reference to FIGS. 1 and 2.

FIG. 1 is a schematic view showing a display device according to an exemplary embodiment of the present system and method. FIG. 2 is a cross-sectional view schematically showing a section taken along line II-II in the display device shown in FIG. 1.

Referring to FIG. 1, the display device according to an exemplary embodiment of the present system and method includes a display panel 10, a display controller 20 connected to the display panel 10, and a touch controller 30.

The display panel 10 includes a touch sensor for sensing contact of an external object such as a hand or pen. The touch sensor may be formed on an outer surface of the display panel (on-cell type) or formed inside the display panel (in-cell type). In addition, the touch sensor may be formed on a separate panel and attached on the display panel of an organic light emitting diode display, a liquid crystal display, and/or the like (add-on type). The display device according to an exemplary embodiment of the present system and method is described in detail below as having an on-cell type touch sensor that is mainly formed on an upper surface of the display panel of the organic light emitting diode display, which is provided as an example. However, the type of the touch sensor or the kind of the display device is not limited to this example.

The display panel 10 displays an image and senses touch. The display panel 10 includes a display area DA where an image is displayed, a touch area TA where a touch may be sensed, and a peripheral area PA surrounding the display area DA. FIG. 1 shows these areas from a plan view.

The touch area TA may be a region where contact, such as to when an object comes into direct contact with the display panel 10 (a contact touch), or movement, such as when an object moves (for example, hovers) in close proximity to or adjacent to the display panel 10 (a non-contact touch), may be sensed as a touch. The touch area TA may overlap and almost match the display area DA.

Figure 2:
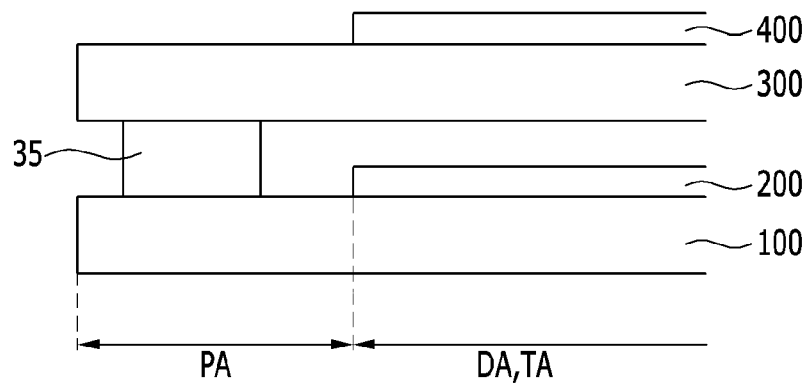
FIG. 2 is a cross-sectional view schematically showing a section taken along line II-II in the display device shown in FIG. 1.

Referring to FIG. 2, the display panel 10 includes a lower substrate 100, a display active layer 200 formed on the lower substrate 100, an upper substrate 300 formed on the display active layer 200, and a touch sensing layer 400 formed on the upper substrate 300. The display active layer 200 includes a plurality of pixels PX and a plurality of display signal lines connected with the plurality of pixels PX to deliver a driving signal, and is mainly positioned on the display area DA. The touch sensing layer 400 includes a plurality of touch electrodes TE and a plurality of touch signal lines connected with the plurality of touch electrodes TE and is mainly positioned on the touch area TA.

An anti-reflection layer (not shown) that reduces reflection of external light may be positioned on the touch sensing layer 400, and may be a polarization layer including a linear polarizer, a retarder, and so on. The lower substrate 100 and the upper substrate 300 are sealed by a sealing member 35 in the peripheral area PA. The sealing member 35 may surround the display area DA to form a closed curve.

If the display panel is an organic light emitting diode panel, the upper substrate 300 may function as an encapsulation substrate. If the display panel is a liquid crystal display panel, the display panel may include a liquid crystal layer positioned between the lower substrate 100 and the upper substrate 300 and include the touch sensing layer 400 on the upper substrate 300. Some liquid crystal display panels may not have the upper substrate, but may have a liquid crystal injected into a micro space. In this case, the touch sensing layer may be positioned on a layer, such as a capping layer, that is positioned on the micro space.

A pixel of the organic light emitting diode display and a structure thereof are described in more detail with reference to FIGS. 3, 4, and 5.

Figure 3:
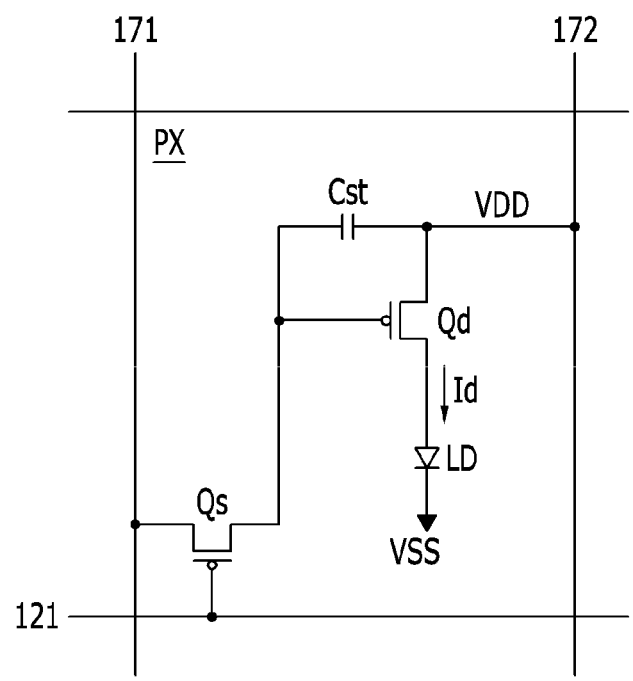
FIG. 3 is an equivalent circuit diagram of a pixel of an organic light emitting diode display according to an exemplary embodiment of the present system and method.
Figure 4:
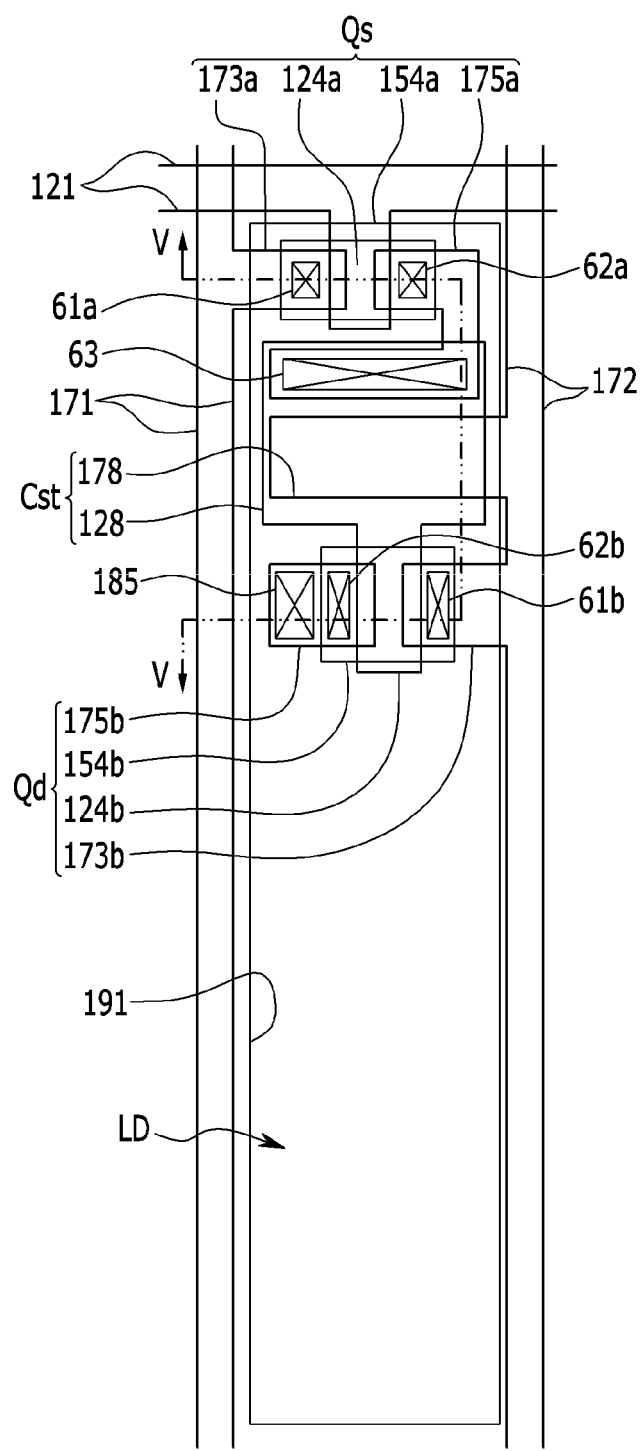
FIG. 4 is a layout view of a pixel of an organic light emitting diode display according to an exemplary embodiment of the present system and method.

FIG. 3 is an equivalent circuit diagram of a pixel of an organic light emitting diode display according to an exemplary embodiment of the present system and method FIG. 4 is a layout view of a pixel of an organic light emitting diode display according to an exemplary embodiment of the present system and method. FIG. 5 is a cross-sectional view showing the pixel in FIG. 4 taken along line A-A.

Referring to FIG. 3, the organic light emitting diode display includes a plurality of display signal lines 121, 171, and 172 and a plurality of pixels connected with the plurality of display signal lines 121, 171, and 172 and approximately arranged in the form of a matrix. A pixel is a minimum unit that displays an image, and each pixel may display any one of red, green, and blue, which are three primary colors of light. The pixel may be a red pixel R, a green pixel G, or a blue pixel B depending on the displayed color. The red pixel R, the green pixel G, and the blue pixel B may be repetitively disposed in a certain order. In this specification, a unit pixel refers to a contiguous pixel group that includes one of each of the three kinds of color pixels. Depending on embodiments, the plurality of pixels may further include a white pixel W that displays white, and the unit pixel may further include the white pixel W.

The plurality of display signal lines include a plurality of gate lines 121 that each delivers a gate signal, a plurality of data lines 171 that each delivers a data signal, and a plurality of driving voltage lines 172 that each deliver a driving voltage VDD. The gate lines 121 extend approximately in a row direction and are approximately parallel to each other, and the data lines 171 and the driving voltage lines 172 extend approximately in a column direction and are approximately parallel to each other. The gate signal and the data signal may be applied through the display controller (see FIG. 1).

Each pixel includes a switching thin film transistor Qs, a driving thin film transistor Qd, a storage capacitor Cst, and a light-emitting device LD.

The switching thin film transistor Qs has a control terminal, an input terminal, and an output terminal. The control terminal is connected to one of the gate lines 121, the input terminal is connected to one of the data lines 171, and the output terminal is connected to the driving thin film transistor Qd. The switching thin film transistor Qs delivers the data signal applied to the data line 171 to the driving thin film transistor Qd in response to the gate signal applied to the gate line 121.

The driving thin film transistor Qd also has a control terminal, an input terminal, and an output terminal. The control terminal is connected to the switching thin film transistor Qs, the input terminal is connected to a driving voltage line 172, and the output terminal is connected to the light-emitting device LD. The driving thin film transistor Qd outputs an output current Id whose magnitude varies depending on the voltage difference between the control terminal and the output terminal.

The storage capacitor Cst is connected between the control terminal and the input terminal of the driving thin film transistor Qd. The storage capacitor Cst charges the data signal applied to the control terminal of the driving thin film transistor Qd and maintains the data signal for a period of time after the switching thin film transistor Qs is turned off.

The light-emitting device LD is an organic light emitting diode that has an anode connected to the output terminal of the driving thin film transistor Qd and a cathode connected to a common voltage VSS. The light-emitting device LD displays an image by emitting light at an intensity that depends on the output current Id of the driving thin film transistor Qd. The light-emitting device LD may include an organic material that uniquely emits light of any one or more of the basic colors, such as the three primary colors of red, green, and blue, or include an organic material that emits light of white color, and the organic light emitting diode display may display a desired image using spatial arrangement of these colors.

Each of the switching thin film transistor Qs and the driving thin film transistor Qd may be n-channel electric field effect transistor (FET) or p-channel electric field effect transistor. The manner in which the switching and driving thin film transistors Qs and Qd, the storage capacitor Cst and light-emitting device LD are connected may be changed.

Figure 5:
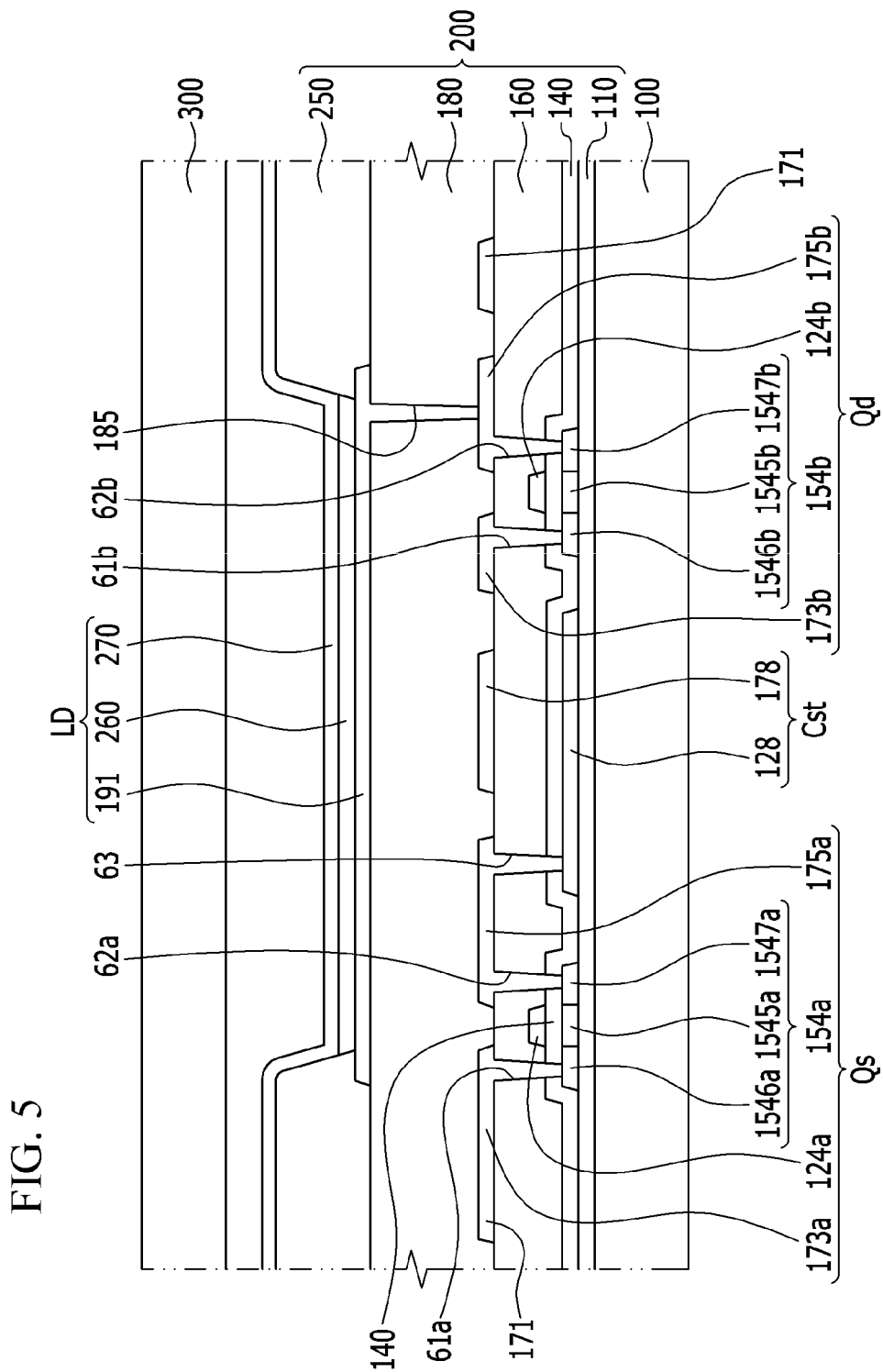
FIG. 5 is a cross-sectional view showing the pixel in FIG. 4 taken along line A-A.

Referring to FIGS. 4 and 5, a display panel of an organic light emitting diode display according to an exemplary embodiment includes a lower substrate 100, a display active layer 200, and an upper substrate 300.

The lower substrate 100 is a transparent insulation substrate that is made of transparent plastic, glass, and/or the like. For a flexible display device, the lower substrate 100 may be a flexible substrate made of a transparent polymer film.

The display active layer 200 includes a buffer layer 110, switching and driving semiconductor layers 154a and 154b, a gate insulating layer 140, a gate line 121, a first capacitor plate 128, an interlayer insulating layer 160, a data line 171, a driving voltage line 172, a switching drain electrode 175a, a driving drain electrode 175b, and a passivation layer 180. The display active layer 200 further includes the light-emitting device LD and a pixel defined layer 250.

The buffer layer 110 may be formed on the lower substrate 100, may include silicon nitride (SiNx), silicon oxide (SiOx), and/or the like, and may be formed in a single layer or multiple layers. The buffer layer 110 may serve to prevent infiltration of impurity, moisture, and outdoor air that degrade characteristics of semiconductor devices and may planarize the surface.

A switching semiconductor layer 154a and a driving semiconductor layer 154b are disposed on the buffer layer 110 to be spaced apart from each other. Each of the switching semiconductor layer 154a and the driving semiconductor layer 154b may be made of polycrystalline silicon and include channel regions 1545a and 1545b, source regions 1546a and 1546b, and drain regions 1547a and 1547b. The source regions 1546a and 1546b and the drain regions 1547a and 1547b are disposed on both sides of the channel regions 1545a and 1545b, respectively.

The channel regions 1545a and 1545b are formed of an intrinsic semiconductor, which is not doped with an impurity, and the source regions 1546a and 1546b and the drain regions 1547a and 1547b are formed of an impure semiconductor, which is doped with a conductive impurity.

A gate insulating layer 140 is disposed on the channel regions 1545a and 1545b of the switching semiconductor layer 154a and the driving semiconductor layer 154b, respectively. The gate insulating layer 140 may have a single layer or multiple layers and may include one or more of silicon nitride and silicon oxide.

The gate line 121 and the first capacitor plate 128 are disposed on the gate insulating layer 140.

The gate line 121 extends in a horizontal direction (orientation as shown in FIG. 4) and delivers a gate signal, and includes a switching gate electrode 124a that protrudes from the gate line 121 to overlap the switching semiconductor layer 154a. The first capacitor plate 128 includes the driving gate electrode 124b that protrudes from the first capacitor plate 128 to overlap the driving semiconductor layer 154b. The switching gate electrode 124a and the driving gate electrode 124b overlap the channel regions 1545a and 1545b, respectively.

The interlayer insulating layer 160 is disposed on the gate line 121, the first capacitor plate 128, and the buffer layer 110. A switching source contact hole 61a and a switching drain contact hole 62a are formed in the interlayer insulating layer 160 to expose the source region 1546a and the drain region 1547a of the switching semiconductor layer 154a, respectively. In addition, a driving source contact hole 61b and a driving drain contact hole 62b are formed in the interlayer insulating layer 160 to expose the source region 1546b and the drain region 1547b of the driving semiconductor layer 154b, respectively.

The data line 171, the driving voltage line 172, the switching drain electrode 175a, and the driving drain electrode 175b are disposed on the interlayer insulating layer 160.

The data line 171 extends in a direction intersecting the gate line 121 and delivers a data signal, and includes a switching source electrode 173a that protrudes from the data line 171 to overlap the switching semiconductor layer 154a.

The driving voltage line 172 delivers a driving voltage, is separated from the data line 171, and extends in the same direction as the data line 171. The driving voltage line 172 includes a driving source electrode 173b that protrudes from the driving voltage line 172 to overlap the driving semiconductor layer 154b and a second capacitor plate 178 that protrudes from driving voltage line 172 and overlaps the first capacitor plate 128. The first capacitor plate 128 and the second capacitor plate 178 form a storage capacitor Cst having the interlayer insulating layer 160 as a dielectric material.

The switching drain electrode 175a faces the switching source electrode 173a, and the driving drain electrode 175b faces the driving source electrode 173b.

The switching source electrode 173a and the switching drain electrode 175a are connected to the source region 1546a and the drain region 1547a of the switching semiconductor layer 154a through the switching source contact hole 61a and the switching drain contact hole 62a, respectively. In addition, the switching drain electrode 175a overlaps the first capacitor plate 128 and is electrically connected with the first capacitor plate 128 and the driving gate electrode 124b through the first contact hole 63 formed in the interlayer insulating layer 160.

The driving source electrode 173b and the driving drain electrode 175b are connected to the source region 1546b and the drain region 1547b of the driving semiconductor layer 154b through the driving source contact hole 61b and the driving drain contact hole 62b, respectively.

The switching semiconductor layer 154a, the switching gate electrode 124a, the switching source electrode 173a, and the switching drain electrode 175a form the switching thin film transistor Qs, and the driving semiconductor layer 154b, the driving gate electrode 124b, the driving source electrode 173b, and the driving drain electrode 175b form the driving thin film transistor Qd.

The passivation layer 180 is positioned on the data line 171, the driving voltage line 172, the switching drain electrode 175a, and the driving drain electrode 175b. A second contact hole 185 that exposes the driving drain electrode 175b is formed on the passivation layer 180.

The light-emitting device LD and the pixel defined layer 250 are disposed on the passivation layer 180.

The light-emitting device LD includes the pixel electrode 191, the organic emission layer 260 and the common electrode 270.

The pixel electrode 191 is disposed on the passivation layer 180 and is electrically connected with the driving drain electrode 175b of the driving thin film transistor Qd through the second contact hole 185 formed in the passivation layer 180. The pixel electrode 191 is an anode of the light-emitting device LD. The pixel electrode 191 may include a reflective metal, such as lithium (Li), calcium (Ca), lithium fluoride/calcium (LiF/Ca), lithium fluoride/aluminum (LiF/Al), aluminum (Al), silver (Ag), magnesium (Mg), and/or gold (Au).

The pixel defined layer 250 is disposed at an edge of the pixel electrode 191 and on the passivation layer 180. The pixel defined layer 250 has an opening that exposes the pixel electrode 191. From a plan view, a region where the pixel defined layer 250 is formed corresponds to a non-pixel area, and the opening that exposes the pixel electrode 191 corresponds to a pixel area. The pixel defined layer 250 may be formed of a resin material such as polyacrylates and/or polyimides.

The organic emission layer 260 is disposed on the pixel electrode 191 in the opening of the pixel defined layer 250. The organic emission layer 260 includes an emission layer and is formed in multiple layers including one or more of a hole injection layer (HIL), a hole transport layer (HTL), an electron transport layer (ETL), and an electron injection layer (EIL). When the organic emission layer 260 includes all of the hole injection layer, the hole transport layer, the electron transport layer, and the electron injection layer, the hole injection layer is positioned on the pixel electrode 191 that is an anode, and the hole transport layer, the emission layer, the electron transport layer, and the electron injection layer are sequentially stacked thereon.

The organic emission layer 260 may include a red organic emission layer, a green organic emission layer, and a blue organic emission layer that emit red light, green light, and blue light, respectively. The red organic emission layer, the green organic emission layer, and the blue organic emission layer are formed in a red pixel R, a green pixel G, and a blue pixel B, respectively, which constitute a unit pixel for displaying a color image. In the organic emission layer 260, all of the red organic emission layer, the green organic emission layer, and the blue organic emission layer may be stacked on the red pixel R, the green pixel G, and the blue pixel B, and a red color filter, a green color filter, and a blue color filter may be formed for each pixel to implement a color image.

The common electrode 270 is positioned on the pixel defined layer 250 and the organic emission layer 260. The common electrode 270 may be formed by thinly stacking a metal, such as lithium, calcium, lithium fluoride/calcium, lithium fluoride/aluminum, aluminum, silver, magnesium, and/or gold, to have a light transmittance and may be formed of a transparent conductive material such as ITO, IZO, ZnO, and/or $In_2O_3$. The common electrode 270 is a cathode of the light-emitting device LD.

The upper substrate 300 is positioned on the common electrode 270. The upper substrate 300 may prevent infiltration of moisture, oxygen, etc., from the outside by encapsulating the light-emitting device LD. The upper substrate 300 may include a glass substrate and a thin film encapsulating layer TFE including a plurality of encapsulating thin films. For example, the thin film encapsulating layer may include one or more inorganic films and one or more organic films, and may have a plurality of inorganic films and a plurality of organic films that are alternately stacked. The above-described touch sensing layer 400 may be positioned on or below the upper substrate 300.

A touch sensing layer of a display device according to an exemplary embodiment of the present system and method is described in detail now with reference to FIGS. 6, 7, 8, and 9.

Figure 6:
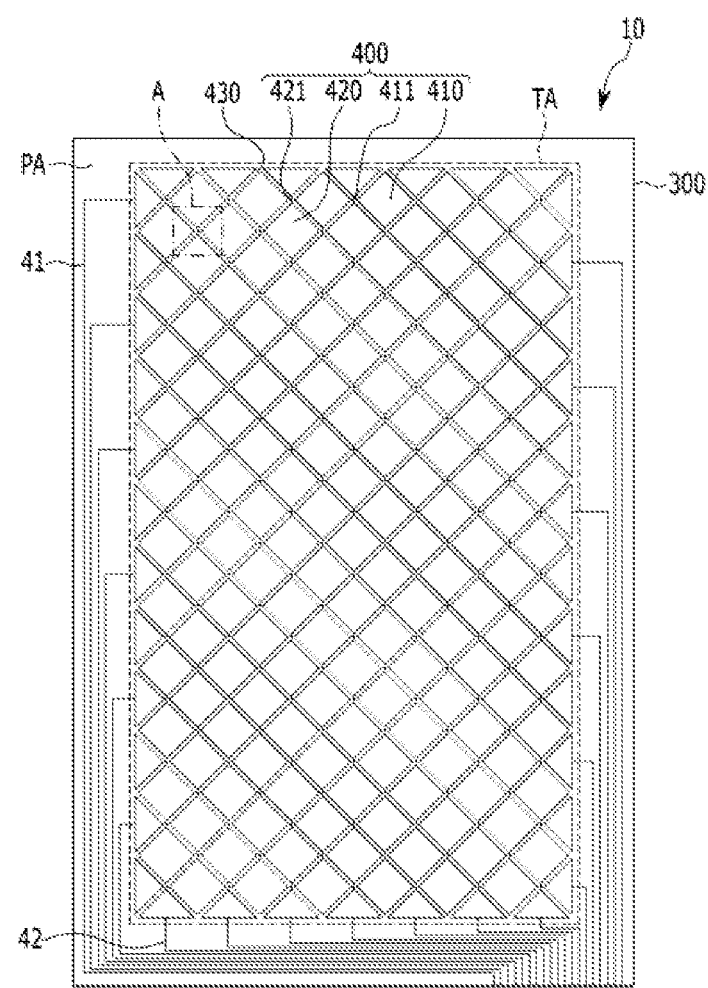
FIG. 6 is a top plan view showing a touch sensor of a display device according to an exemplary embodiment of the present system and method.
Figure 7:
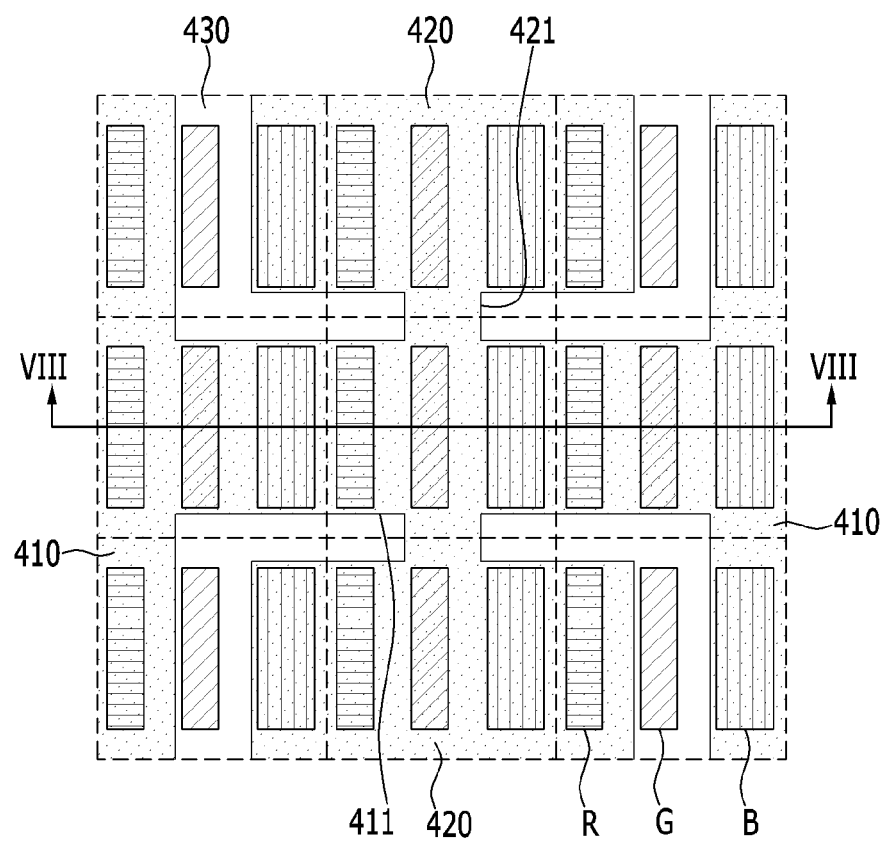
FIG. 7 is an enlarged view showing an example of region A in the touch sensor shown in FIG. 6.
Figure 8:
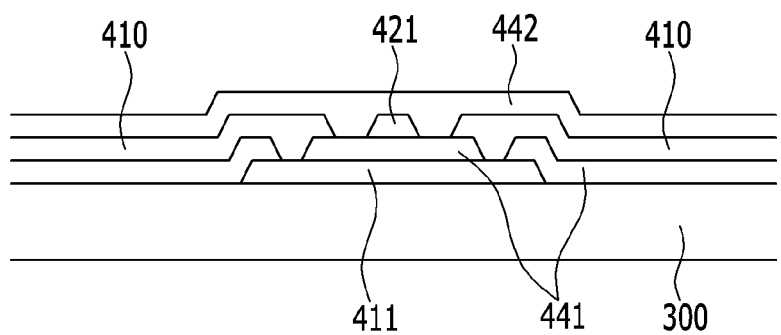
FIG. 8 is a cross-sectional view showing the touch sensor shown in FIG. 7 taken along line VIII-VIII.
Figure 9:
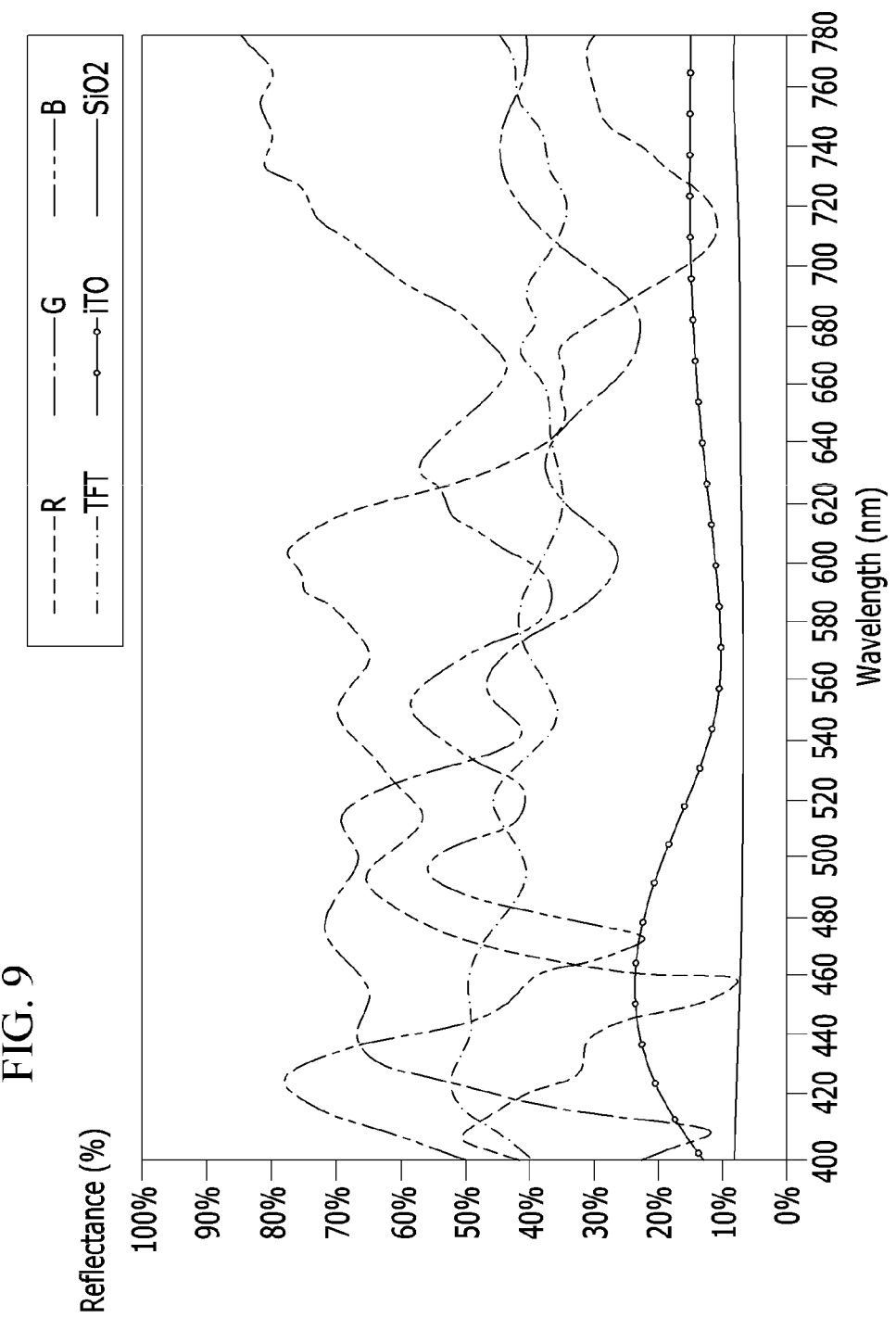
FIG. 9 is a graph showing reflectance characteristics by pixel and reflectance characteristics by region of a touch sensing layer.

FIG. 6 is a top plan view showing a touch sensor of a display device according to an exemplary embodiment of the present system and method. FIG. 7 is an enlarged view showing an example of region A in the touch sensor shown in FIG. 6. FIG. 8 is a cross-sectional view showing the touch sensor shown in FIG. 7 taken along line VIII-VIII. FIG. 9 is a graph showing reflectance characteristics by pixel and reflectance characteristics by region of a touch sensing layer.

Referring to FIG. 6, the touch sensor includes the touch sensing layer 400 that may be formed on the upper substrate 300 of the above-described display panel 10. The touch sensing layer 400 includes a plurality of first touch electrodes 410 and a plurality of second touch electrodes 420. Each first touch electrode 410 and each second touch electrode 420 may be physically and electrically separated from each other by a gap 430 formed between the first touch electrode 410 and the second touch electrode 420. The gap 430 may correspond to a region where the touch electrodes 410 and 420 are not formed in the touch sensing layer 400 and may have a reflectance and a transmittance different from a region where the touch electrodes 410 and 420 are formed. The gap 430 may be disposed to expose pixels of a specific color(s) and non-pixel areas (corresponding to the pixel defined layer of the organic light emitting diode display). Here, "expose" means not being covered by the touch electrodes 410 and 420 and their connectors 411 and 421 of the touch sensing layer 400, and the exposed pixel and the exposed non-pixel area do not overlap the touch electrodes 410 and 420 and the connectors 411 and 421. The first and second touch electrodes 410 and 420 are separated to expose specific color pixels and non-pixel areas, and no dummy electrode is formed in the gap 430. A dummy electrode refers to an electrode that is electrically isolated, or floated, from a signal carrying element (e.g., voltage line line).

The plurality of first touch electrodes 410 and the plurality of second touch electrodes 420 are alternately distributed and disposed not to overlap each other in the touch area TA. The plurality of first touch electrodes 410 are disposed in column and row directions, and also the plurality of second touch electrodes 420 are disposed in column and row directions.

Each first touch electrode 410 and each second touch electrode 420 are positioned in the same layer, but may be positioned in different layers. In general, the first touch electrode 410 and the second touch electrode 420 have, but are not limited to, the shape of a quadrangle (rhombus), the shape of a polygon, such as a hexagon, a circle, or an ellipse, or have various shapes such as a protrusion part for improving the sensitivity of the touch sensor.

At least some of the plurality of first touch electrodes 410 arranged in the same row or column may be connected to or separated from each other inside or outside the touch area TA. Likewise, at least some of the plurality of second touch electrodes 420 arranged in the same row or column may be connected to or separated from each other inside or outside the touch area TA. For example, as shown in FIG. 6, the plurality of first touch electrodes 410 disposed in the same row may be connected to each other through the first connector 411 in the touch area TA, and the plurality of second touch electrodes 420 disposed in the same column may be connected to each other through the second connector 421 in the touch area TA. The first touch electrodes 410 that are connected to each other in each row may be connected with a touch controller through a first touch signal line 41, and the second touch electrodes 420 that are connected to each other in each column may be connected with a touch controller through a second touch signal line 42. The first and second touch signal lines 41 and 42 are positioned in the peripheral area PA of the display panel 10, but may be positioned in the touch area TA. At one end of the first and second touch signal lines 41 and 42, a pad (not shown) may be formed to connect to the touch controller in the peripheral area PA of the display panel 10.

The first touch electrode 410 and the second touch electrode 420 that are adjacent to each other to form a mutual capacitor that functions as the touch sensor. The mutual capacitor may receive a driving signal through one of the first touch electrode 410 and the second touch electrode 420 and output an output signal through the other touch electrode. The output signal may correspond to a change in the amount of electric charges due to a touch of an external object. Unlike shown in FIGS. 6 to 8, the plurality of first touch electrodes 410 may be separated from each other (as opposed to being connected by connectors 411) and the plurality of second touch electrodes 420 may be separated from each other (as opposed to being connected by connectors 421) to form independent touch electrodes, each of which may be connected with the touch controller through its own touch signal line (not shown). In such case, each touch electrode is the touch sensor and forms a self-capacitor. The self-capacitor may receive a driving signal and be charged with a predetermined amount of electric charges. When a touch is applied, the self-capacitor may output an output signal different from the input driving signal when a touch is applied, and thus the charged amount of electric charges is changed.

FIG. 7 shows an enlarged portion of the touch sensing layer 400 that mainly includes the gap 430 between the first and second touch electrodes 410 and 420 that are adjacent to each other and also shows a pixel that overlaps the touch sensing layer 400. The first touch electrodes 410 that are adjacent are shown, approximately half of which are shown on the left side and the other half of which are shown on the right side, and the second touch electrodes 420 that are adjacent are shown, approximately half of which are shown on the upside and the other half of which are shown on the downside. Accordingly the combined size of the adjacent first touch electrodes 410 shown in FIG. 7 corresponds to the size of one first touch electrode 410, and the combined size of the adjacent second touch electrodes 420 corresponds to the size of one second touch electrode 420. FIG. 8 is a cross-sectional view of the first and second connectors 411 and 421 of FIG. 7 taken along line VIII-VIII and shows no pixels.

Referring to FIGS. 6, 7, and 8, the first connector 411 for connecting the first touch electrodes 410 that are adjacent to each other is positioned on the upper substrate 300, and a first insulating layer 441 is formed thereon. The first touch electrodes 410, the second touch electrodes 420, and the second connector 421 for connecting the second touch electrodes 420 that are adjacent to each other are formed on the first insulating layer 441. A second insulating layer 442 is formed on, and protects, the first touch electrodes 410, the second touch electrodes 410, and the second connector 421. Each first touch electrode 410 is electrically connected with the first connector 411 through a contact hole that is formed in the first insulating layer 441. A portion of the second connector 421 overlaps the first connector 411, but is physically and electrically separated by the first insulating layer 441 from the first connector 411. The first touch electrode 410, the second touch electrode 420, and the second connector 421 may be formed of the same material and may be patterned together. The first connector 411 and the touch signal lines 41 and 42 may be formed of the same material and may be patterned together.

Alternatively, the first touch electrode 410 and the second connector 421 may be positioned in the same layer over the upper substrate 300, and the first connector 411 may be formed over the first touch electrode 410 and the second connector 421 with the first insulating layer 441 therebetween. As another alternative, the first connector 411 for connecting the first touch electrodes 410 that are adjacent to each other may be positioned in the same layer as, and integrated with, the first touch electrode 410, while the second connector 421 for connecting the second touch electrodes 420 that are adjacent to each other may be positioned in a different layer from the second touch electrode 420. Thus, these alternatives demonstrate, there are various ways for connecting the touch electrodes.

The first and second touch electrodes 410 and 420 are formed of a material having a predetermined transmittance to transmit light that originates from the display panel 10. For example, the first and second touch electrodes 410 and 420 are formed of a transparent conductive oxide (TCO), such as an indium tin oxide (ITO) and an indium zinc oxide (IZO), but may be formed of a conductive material such as a silver nano wire (AgNW), a metal mesh, a carbon nanotube (CNT). One or more of the first and second connectors 411 and 421 may be formed of the same material as the first and second touch electrodes 410 and 420 or may be formed of the same material as the first and second touch signal lines 41 and 42, but may be formed of a material different from the above materials. The first and second insulating layers 441 and 442 may be formed of an inorganic oxide such as a silicon oxide (SiOx) and/or a silicon nitride (SiNx). The first and second touch signal lines 41 and 42 are formed of a metal material such as molybdenum (Mo), silver (Ag), titanium (Ti), copper (Cu), aluminum (Al), and/or molybdenum/aluminum/molybdenum (Mo/Al/Mo), but may be formed of a transparent conductive oxide (TCO).

Referring again to FIG. 7, the pixel includes a red pixel R, a green pixel G, and a blue pixel B, which are indicated by a quadrangle filled with horizontal lines, a quadrangle filled with diagonal lines, and a quadrangle filled with vertical lines, respectively. One red pixel R, one green pixel G, and one blue pixel B constitute a unit pixel, which is indicated by a dotted-line quadrangle. The pixels may have the same or different sizes and display any one of the colors. For example, as shown in FIG. 7, the blue pixel B is bigger than the red and green pixels R and G. It is shown that the pixels are arranged in each pixel row in the order of the red pixel (R), the green pixel (G), and the blue pixel (B). The pixels in each pixel column, however, are not arranged in the above order and may be arranged in various orders. While the pixel arrangement of FIG. 7 is shown as having a stripe scheme, it is not limited to the stripe scheme. For example, the pixels may be arranged in a PenTile® scheme. Each pixel R, G, or B corresponds to a pixel area, and a peripheral region corresponds to a non-pixel area.

The first and second touch electrodes 410 and 420 may be formed in consideration of the arrangement of the pixels. That is, the first and second touch electrodes 410 and 420 may be formed to have a pitch about 3 times greater than the pitch of the unit pixel including three pixels, that is, the red pixel R, the green pixel G, and the blue pixel B. Herein, a touch electrode pitch may refer to the distance from the center of a touch electrode to the center of the next touch electrode, and a unit pixel pitch may refer to the distance from the center of a unit pixel to the center of the next unit pixel. However, the size of the first and second touch electrodes 410 and 420 is not limited thereto and may be variously designed in consideration of the size of the pixel, the size of the display panel, and so on. For example, the first and second touch electrodes 410 and 420 may be formed to have a pitch about 3, 4, 5, or 6 times greater than the pitch of the unit pixel. When the pitch of the first and second touch electrodes 410 and 420 is certain times (e.g., a nonzero integer multiple) greater than the pitch of the unit pixel, the pixels may be advantageously arranged to expose pixels of a specific color, while the first and second touch electrodes 410 and 420 are formed to have the same or almost the same size and shape.

The green pixel G and the non-pixel area are exposed in the gap 430 between the first touch electrode 410 and the second touch electrode 420. Accordingly, although the first and second touch electrodes 410 and 420 are approximately in the form of a rhombus, edges of the first and second touch electrodes 410 and 420 extend in horizontal and vertical directions such that the green pixel G and the non-pixel area may be exposed, and thus the first and second touch electrodes 410 and 420 have the shape of stairs. A total of four green pixels G are exposed in the gap 430 shown in FIG. 7, but the number may vary depending on the arrangement of color pixels. As such, when the first and second touch electrodes 410 and 420 and the gap 430 are disposed according to the arrangement of the pixels, and in the gap 430, a dummy electrode is not formed and pixels of a specific color are exposed, both the power consumption of the display panel and reflection by the touch sensing layer may be reduced. The reason is described below.

FIG. 9 is a graph showing reflectance by pixel color and reflectance characteristics by region of a touch sensing layer. For example, when the first and second touch electrodes 410 and 420 are formed of ITO, and the first and second insulating layers 441 and 442 are formed of silicon dioxide (SiO$_2$), the gap 430 having no ITO layer formed therein (i.e, the curve labeled "SiO2") has a lower reflectance than the first and second touch electrodes 410 and 420 having the ITO layer formed therein because ITO has a higher reflectance than the silicon dioxide (SiO$_2$). Accordingly, when the dummy electrode typically formed of the same material as the first and second touch electrodes 410 and 420 is not formed in the gap 430, the entire reflectance of the display panel may be reduced.

It can be seen from FIG. 9 that, since reflectance characteristics differ depending on the color of the pixel, the reflectance may be minimized when a region of the gap 430 may be properly disposed to expose pixels of a specific color. In particular, in a wavelength of about 555 nanometers, at which human eyes are most sensitive to luminance, the reflectance of the green pixel G is lower than the reflectance of the red and blue pixels R and B by about 20% to about 30%. Accordingly, the reflectance may be more reduced when the green pixel G is exposed in the gap 430 than when the red and blue pixels R and B are exposed. In addition, since transmittance and luminance are increased when the pixel is exposed, compared to when the pixel is covered by the dummy electrode, the same luminance may be viewed even when the energy (current or voltage) supplied to the pixel is less. This means power consumption may be reduced. The power consumption may be most reduced when the blue pixel B having the lowest efficiency is exposed. For the organic light emitting diode display, the blue pixel B has lower emission efficiency than the red and green pixels R and G when a current having the same magnitude is applied.

Other exemplary embodiments of the present system and method are described below with reference to FIGS. 10 to 12.

Figure 10:
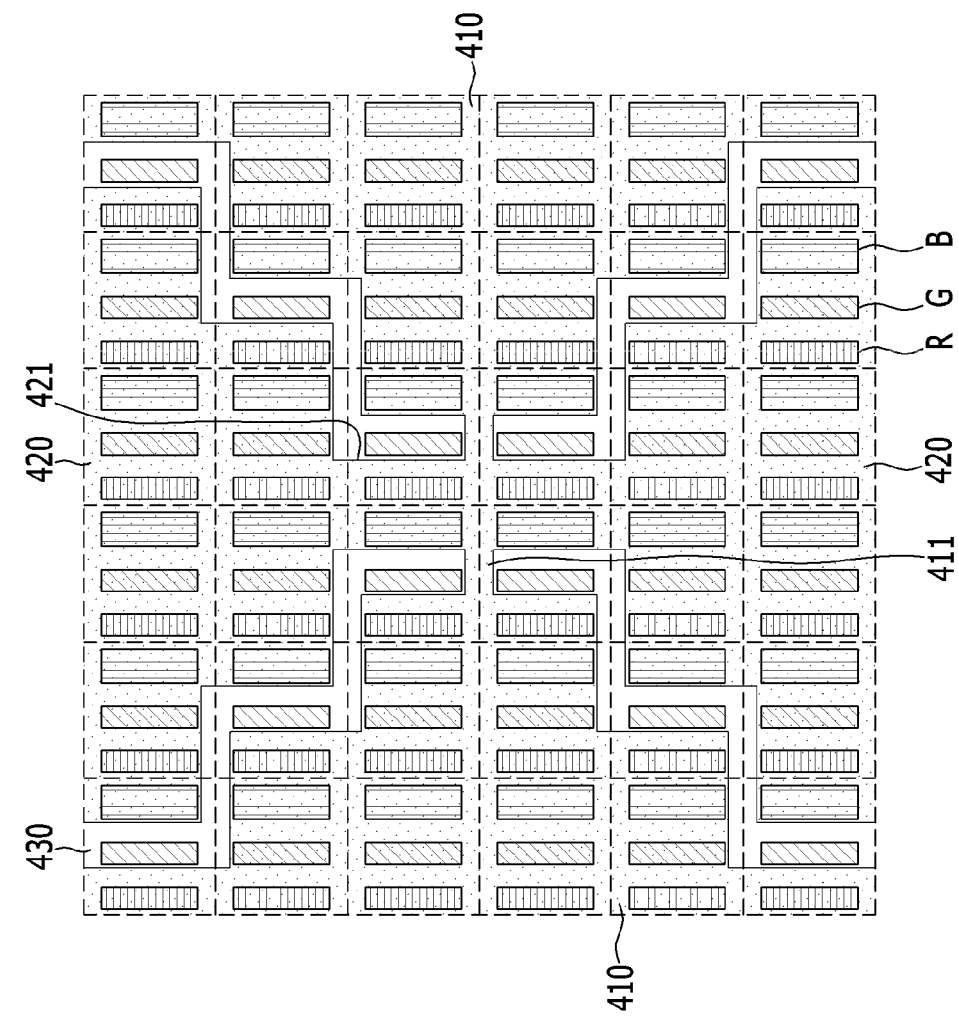
FIGS. 10, 11, and 12 are enlarged views showing other examples of region A of the touch sensor shown in FIG. 6.
Figure 11:
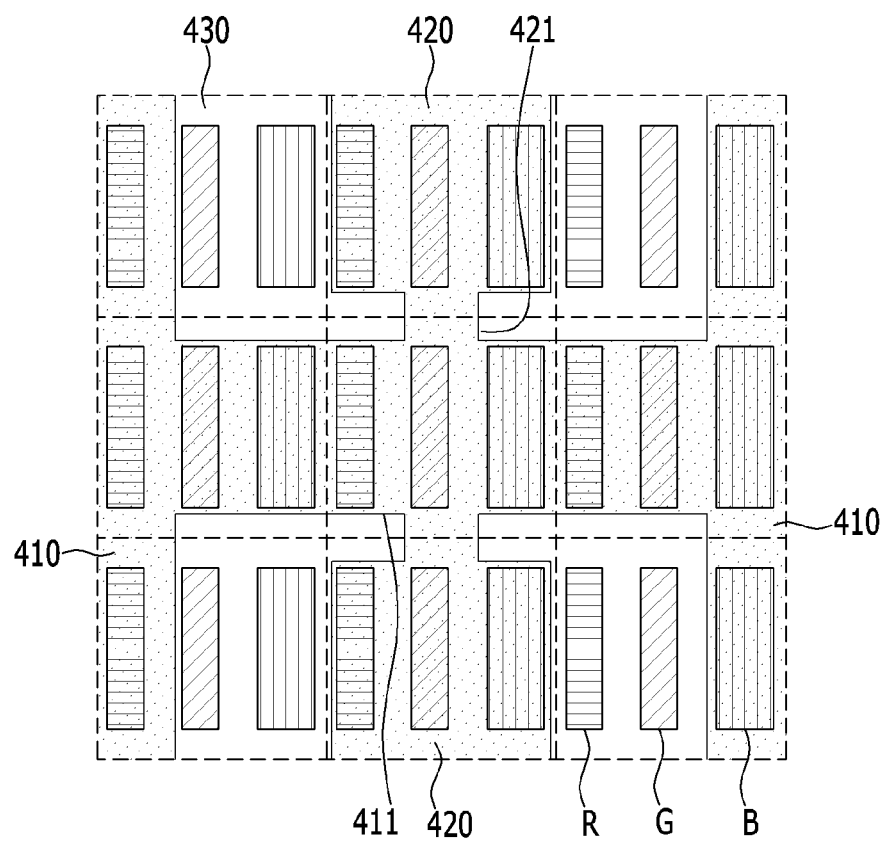
Figure 12:
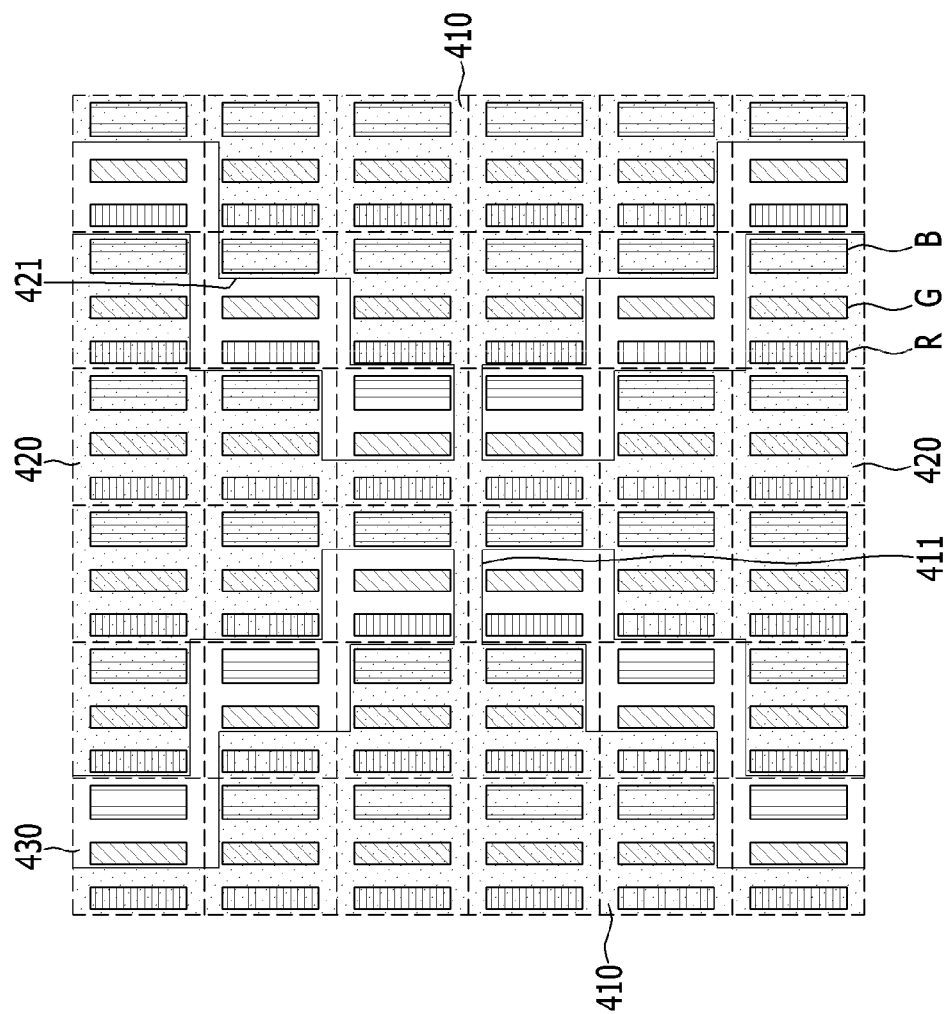

FIGS. 10, 11, and 12 are enlarged views showing other examples of region A of the touch sensor shown in FIG. 6.

The embodiment of FIG. 10 is almost the same as the embodiment of FIG. 7 except that the pitch of the first and second touch electrodes 410 and 420 is about 6 times greater than the pitch of the unit pixel. The green pixel G and the non-pixel area are exposed in the gap 430, and the first and second touch electrodes 410 and 420 are formed to have almost the same size and shape. As the size of the first and second touch electrodes 410 and 420 is increased, an area of the gap 430 increases, and thus the number of green pixels G that are exposed increases to, for example, 12.

Referring to FIGS. 11 and 12, an example in which the blue pixel B or the red pixel R is exposed in addition to the green pixel G is shown. FIG. 11 shows an embodiment in which the pitch of the first and second touch electrodes 410 and 420 is about 3 times greater than the pitch of the unit pixel. FIG. 12 shows an embodiment in which the pitch of the first and second touch electrodes 410 and 420 is about 6 times greater than the pitch of the unit pixel. The green pixel G and the blue pixel B or the red pixel R that is adjacent to the green pixel G in a row direction are positioned and exposed in the gap 430 between the first and second touch electrodes 410 and 420. The non-pixel area is also exposed It is shown in FIG. 12 that the gap 430 is formed such that two pixels that are adjacent in a row direction are exposed. However, the gap 430 may be formed such that one pixel or three or more adjacent pixels are exposed. Alternatively, the gap 430 may be formed such that a different number of pixels are exposed depending on the pixel row.

When the blue pixel B with the lowest efficiency is exposed in addition to the green pixel G with the lowest reflectance, the transmittance can be maximized while the reflectance is minimized. In addition, because the first and second touch electrodes 410 and 420 are formed to have almost the same size and shape, the red pixel R, which has a higher reflectance than the green pixel G and a higher efficiency than the blue pixel B, may be exposed along with the green pixel G to establish symmetry of the first and second touch electrodes 410 and 420 and the gap 430.

In FIGS. 11 and 12, the arrangement in which the green pixel G and an adjacent pixel B or R forming a pair are exposed has been described. However, it should be appreciated that the combination and number of colors of pixels that are exposed are not limited to those described above, and there may be various designs within the scope of the present system and method. That is, the region of the gap 430 may be variously disposed between the first touch electrode 410 and the second touch electrode 420 that have almost the same size.

Since a pixel exposed through the gap 430 may have a higher luminance than a pixel covered by the touch electrodes 410 and 420, non-uniformity of the luminance between the pixels is generated when the image is displayed. Thus, a moiré may be generated, or a pattern of the touch electrode may be recognized. However, since the position of the exposed pixels may be designedly determined, the luminance non-uniformity may be improved by adjusting the data signal that is input to the exposed pixels. In such case, since the adjusted data signal acts on an entire pixel, it is advantageous for the exposed pixel to be exposed as fully as possible, rather than partially. That is, when a portion of one pixel is covered by the touch electrode and the other portion is exposed, it may be difficult to improve the luminance non-uniformity between the two portions by adjusting the data signal.

Table 1 below shows simulation results of optical characteristics for a case in which a dummy electrode is formed on the gap 430 and a case in which a specific pixel is exposed according to the above-described embodiments. Specifically, in a case in which the pitch of each of the touch electrodes 410 and 420 is three times greater than the pitch of a unit pixel and a case in which the pitch of each of the touch electrodes 410 and 420 is six times greater than the pitch of the unit pixel, the dummy electrode was formed of ITO without exposing the gap 430, and white efficiency (a luminance according to an input current when a white image is displayed) and reflectance were measured. In addition, the white efficiency and the reflectance were measured with the red pixel R disposed in a region of the gap 430 and thus exposed, and an improvement rate was calculated relative to when the dummy electrode was formed. The test was repeated with the green pixel G, the blue pixel B, and then the green and blue pixel and the red and green pixel (GB/RG) disposed in the region of the gap 430 and thus exposed. The measurement result and the improvement rate are shown in Table 1.

TABLE 1

| | | | gap | | | |
|---|---|---|---|---|---|---|
| | | ITO Dummy | Exposure | | | |
| Pitch | Optical characteristics | Reference | R | G | B | GB/RG |
| 3 × 3 [945 um] | W efficiency [Cd/A] | 37.1 | 37.2 | 37.4 | 39.1 | 39.5 |
| | Improvement rate of power consumption | — | 0% | −1% | −5% | −6% |
| | Reflectance | 39.3% | 35.4% | 34.7% | 35.6% | 30.8% |
| | Improvement rate of Reflectance | — | −10% | −12% | −9% | −22% |
| | Reflected color [a*b*] | 5.36 | 5.34 | 5.27 | 5.41 | 5.54 |
| 6 × 6 [1890 um] | W efficiency (Cd/A) | 37.1 | 37.2 | 37.3 | 38.3 | 38.5 |
| | Improvement rate of power consumption | — | 0% | −1% | −3% | −4% |
| | Reflectance Improvement | 39.3% | 37.0% | 36.6% | 37.1% | 34.2% |

TABLE 1-continued

| | | gap | | | | |
|---|---|---|---|---|---|---|
| Pitch | Optical characteristics | ITO Dummy Reference | Exposure | | | |
| | | | R | G | B | GB/RG |
| | rate of Reflectance | — | −6% | −7% | −6% | −13% |
| | Reflected color [a*b*] | 5.36 | 5.34 | 5.31 | 5.39 | 5.47 |

As shown in Table 1, it can be seen that depending on the design, power consumption was improved by about 1% to about 6%, and the reflectance was improved by about 9% to about 22%. In addition, as the exposed area increases, the improvement effect increases. This is because the reflectance of ITO is relatively high. In particular, when the green and blue pixel GB and the red and green pixel RG are alternately exposed, the power consumption is improved by about 6%, and the reflectance is improved by about 22%, and thus it can be seen that the improvement effect is highest.

Figure 13:
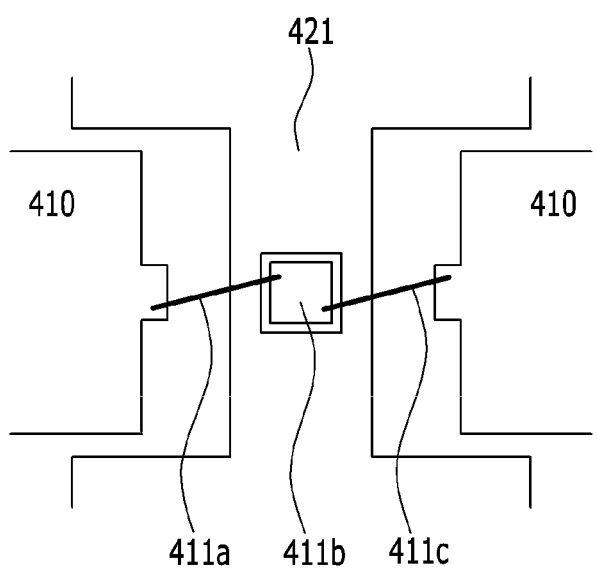
FIG. 13 is a partial enlarged view showing a touch sensor according to another exemplary embodiment of the present system and method.

FIG. 13 is a partial enlarged view showing a touch sensor according to another exemplary embodiment of the present system and method.

The embodiment of FIG. 13 and the embodiment of FIG. 12 are generally similar, but have different first and second connectors 411 and 421. Accordingly, only a region around the first and second connectors 411 and 421 is partially enlarged and shown. Specifically, a second part 411b of the first connector 411 is formed in and separated from the second connector 421 in the form of an island. Accordingly, the first and second touch electrodes 410 and 420, the second connector 421, and the second part 411b of the first connector 411 are formed in a first layer. First and third parts 411a and 411c of the first connector 411 may be positioned below or over the first layer with an insulating layer formed therebetween. One end of each of the first and third parts 411a and 411c is connected to a respective one of the adjacent first touch electrodes 410, and the other end is connected to the second part 411b through contact holes formed in the insulating layer. Accordingly, the adjacent first touch electrodes 410 are electrically connected to each other through the first connector 411 which includes the parts 411a, 411b, and 411c formed in different layers and electrically connected to each other. The first and third parts 411a and 411c of the first connector 411 are formed of a metal wire and disposed diagonally in the non-pixel area. Thus, it is possible to reduce parasitic capacitances caused by the first and third parts 411a and 411c while minimizing coverage of the pixels.

In the above design, characteristics of the touch sensor were verified through simulation, and a result of the verification is shown in Table 2.

TABLE 2

| | No Touch | Touch | ΔCm |
|---|---|---|---|
| Capacitance [V] | 1.5523 × 10⁻¹² | 1.4229 × 10⁻¹² | 0.1294 × 10⁻¹² |

Capacitance values Cm between the first touch electrode 410 and the second touch electrode 420 were measured in a case in which a touch was applied and a case in which a touch was not applied, and a difference ΔCm between the capacitance values Cm was calculated. ΔCm is about 0.13 pV, and thus it can be seen that there is no trouble in operating the touch sensor.

Although exemplary embodiments of the present system and method have been described in detail, the scope of the present system and method is not limited thereto. Modifications and alterations made by those skilled in the art using the basic concept of the present system and method defined in the following claims fall within the scope of the present system and method.

What is claimed is:

1. A display device comprising:
   a first substrate;
   a second substrate;
   a display active layer disposed between the first substrate and the second substrate, the display active layer including a plurality of pixels that are configured to display a first color, a second color, and a third color, respectively, wherein each of the plurality of pixels includes a pixel electrode, a common electrode, and an emission layer between the pixel electrode and the common electrode; and
   a touch sensing layer disposed on the second substrate, the touch sensing layer including first touch electrodes, second touch electrodes, and gaps between the first touch electrodes and the second touch electrodes in a plane view,
   wherein the touch sensing layer is disposed as a separate layer from the common electrode such that the first touch electrodes are disposed as a separate layer from the common electrode,
   the first touch electrodes and second touch electrodes are separated from each other and do not overlap each other in the plane view,
   the first touch electrodes and the second touch electrodes form mutual capacitors functioning as touch sensors,
   the gaps are formed to at least partially overlap the first color pixels and not to overlap an entirety of the second color pixels and an entirety of the third color pixels, and
   each of the gaps includes a first portion extending in a first direction with a first width in the plane view and a second portion extending from the first portion in a second direction perpendicular to the first direction with a second width in the plane view.

2. The display device of claim 1, wherein the touch sensing layer is free from dummy electrodes in the gaps.

3. The display device of claim 2, wherein an edge of each of the first and second touch electrodes is formed in a stair shape.

4. The display device of claim 2, wherein the first color pixels are green pixels.

5. The display device of claim 4, wherein the gaps are formed to further expose second color pixels adjacent to the first color pixels.

6. The display device of claim 5, wherein the second color pixels are blue pixels.

7. The display device of claim 5, wherein the gaps are formed to further expose third color pixels adjacent to the first color pixels.

8. The display device of claim 7 wherein the third color pixels are red pixels.

9. The display device of claim 1, wherein the first color pixel, the second color pixel, and the third color pixel constitute a unit pixel, and
- a pitch of each of the first and second touch electrodes is an integer multiple of a pitch of the unit pixel, the pitch of a touch electrode being the distance between the centers of adjacent touch electrodes of the same type, and the pitch of a unit pixel being the distance between the centers of adjacent unit pixels.

10. The display device of claim 1, wherein the first and second touch electrodes are formed of a transparent conductive oxide.

11. The display device of claim 10, wherein the transparent conductive oxide is an indium tin oxide.

12. The display device of claim 10, wherein the touch sensing layer further includes first connectors for connecting the first touch electrodes that are adjacent to each other; and second connectors for connecting the second touch electrodes that are adjacent to each other, and at least one of the first connector and the second connector is formed of a transparent conductive oxide.

13. The display device of claim 12, wherein one of the first connector and the second connector includes a part formed of a transparent conductive oxide and a part formed of a metal material.

14. The display device of claim 1, wherein the pixel includes a light-emitting device.

15. The display device of claim 1, wherein an entirety of the touch sensing layer is disposed as a separate layer from the common electrode,
- wherein the first touch electrode does not include any portion of the common electrode, and
- wherein the second substrate does not include any portion of the touch sensing layer.

16. The display device of claim 1, wherein the emission layer includes one of a hole injection layer, a hole transport layer, an electron transport layer, and an electron injection layer, and the emission layer is configured to emit at least one of red, blue, and green light.

* * * * *